United States Patent [19]
Jannson et al.

[11] Patent Number: 4,926,412
[45] Date of Patent: May 15, 1990

[54] HIGH CHANNEL DENSITY WAVELENGTH DIVISION MULTIPLEXER WITH DEFINED DIFFRACTING MEANS POSITIONING

[75] Inventors: Tomasz P. Jannson; Joanna L. Jannson; Peter C. Yeung, all of Redondo Beach, Calif.

[73] Assignee: Physical Optics Corporation, Torrance, Calif.

[21] Appl. No.: 158,396

[22] Filed: Feb. 22, 1988

[51] Int. Cl.$^5$ ............................................. H04B 9/00
[52] U.S. Cl. ............................ 370/3; 350/170; 350/96.19; 455/612
[58] Field of Search ............... 370/1, 3; 455/600, 606, 455/607, 612, 617; 350/96.18, 96.19, 170

[56] References Cited

U.S. PATENT DOCUMENTS

| | | | |
|---|---|---|---|
| 3,953,727 | 4/1976 | d'Auria et al. | 370/3 |
| 4,359,259 | 11/1982 | Horner et al. | 370/3 |
| 4,387,953 | 6/1983 | Ludman et al. | 370/3 |
| 4,622,662 | 11/1987 | Laude et al. | 370/3 |
| 4,652,080 | 3/1987 | Carter et al. | 370/3 |
| 4,675,860 | 6/1987 | Laude et al. | 370/3 |
| 4,707,056 | 11/1987 | Bittner et al. | 370/3 |
| 4,740,951 | 4/1988 | Lizet et al. | 370/3 |
| 4,748,614 | 5/1988 | Dammann et al. | 370/3 |

FOREIGN PATENT DOCUMENTS

| | | | |
|---|---|---|---|
| 0042043 | 4/1978 | Japan | 370/3 |
| 2086168 | 4/1982 | United Kingdom | 370/3 |
| 2152317A | 12/1984 | United Kingdom | 370/3 |

Primary Examiner—Robert L. Griffin
Assistant Examiner—L. Van Beek
Attorney, Agent, or Firm—Lyon & Lyon

[57] ABSTRACT

A wavelength division multiplexer/demultiplexer having optical path lengths between a fiber array and a Fourier transform lens, and between a dispersion grating and the lens equal to the focal length of the lens. The optical path lengths reduce losses due to angular acceptance mismatch in the multiplexer. Close orientation of the fiber array about the optical axis and the use of a holographic dispersion grating reduces other losses in the system. Multi-exposure holographic dispersion gratings enable the multiplexer/demultiplexer for extremely broad-band simultaneous transmission and reflection operation. Individual Bragg plane sets recorded in the grating are dedicated to and operate efficiently on discrete wavelength ranges.

5 Claims, 3 Drawing Sheets

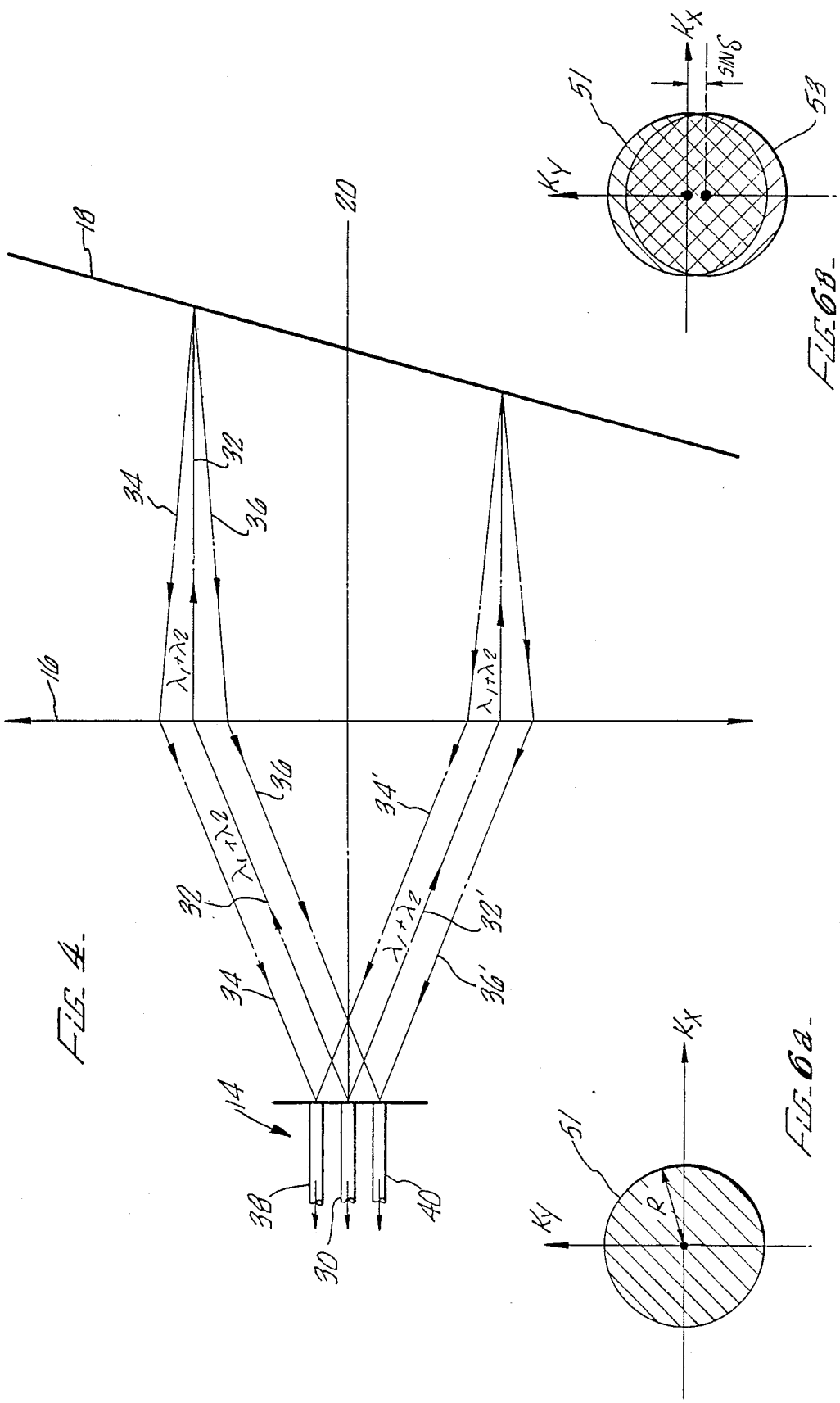

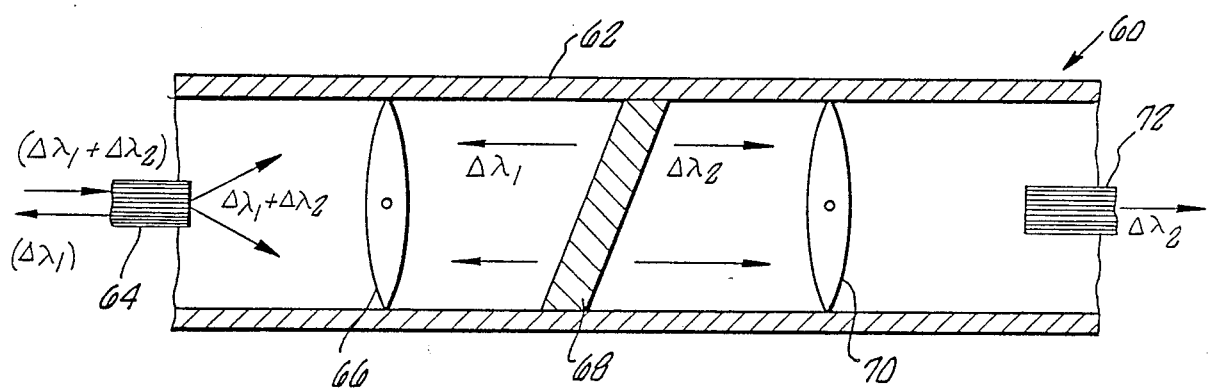
FIG. 7.
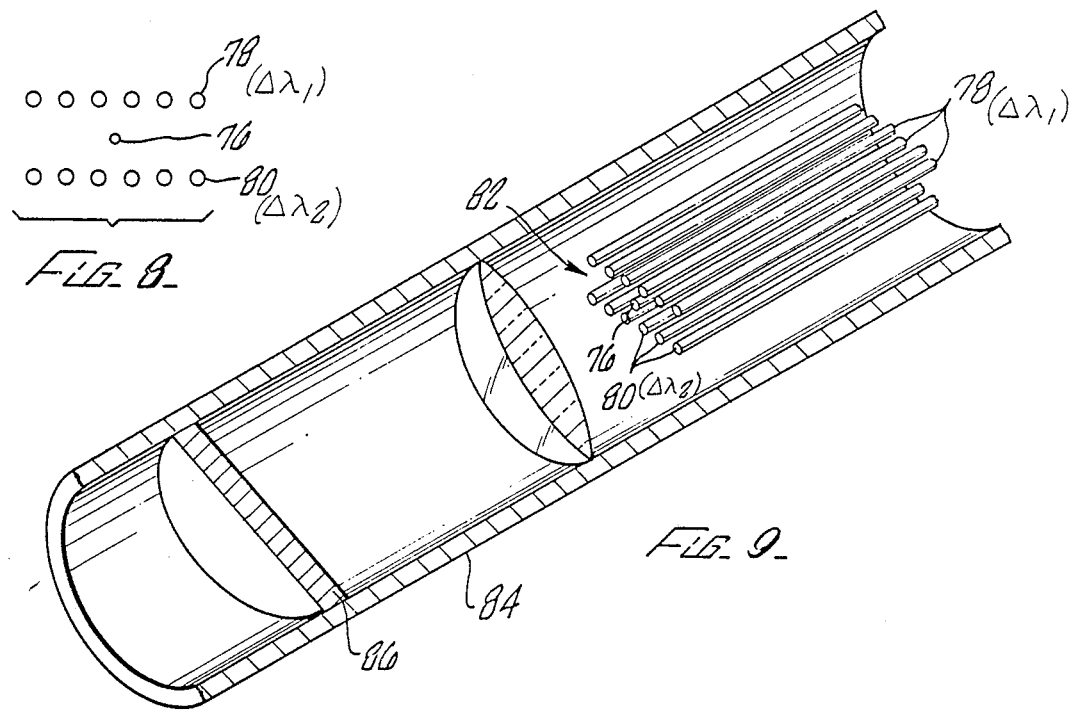
FIG. 8.
FIG. 9.
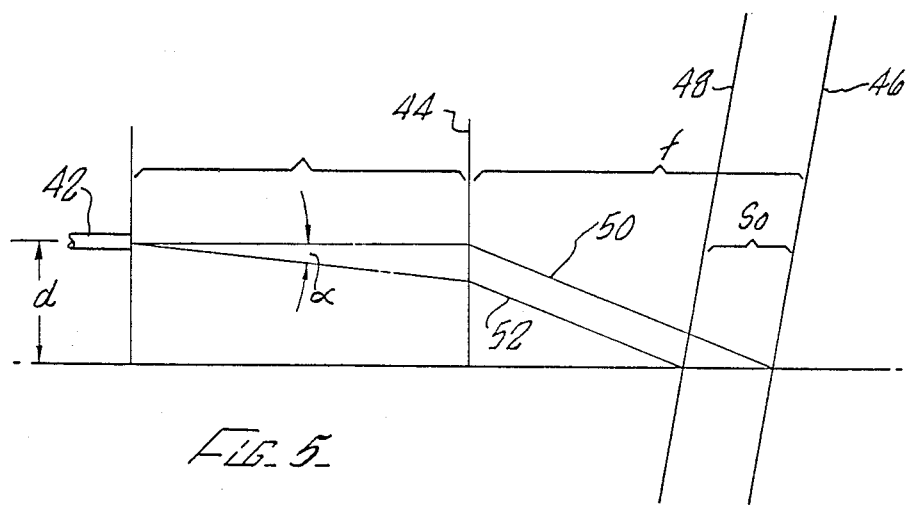
FIG. 5.

HIGH CHANNEL DENSITY WAVELENGTH DIVISION MULTIPLEXER WITH DEFINED DIFFRACTING MEANS POSITIONING

This invention was made with Government support under Contract No. DE-AC03-86ER80416 awarded by the Department of Energy. The Government has certain rights in this invention.

BACKGROUND OF THE INVENTION

1. Field of Use

This invention relates generally to multiplexers and demultiplexers for optical signals. More particularly, this invention relates to multiplexers and demultiplexers that combine and divide light signals on the basis of their wavelength components.

2. Description of the Prior Art

The efficiency of an optical transmission system is greatly limited by the insertion losses of couplers and of more complex components such as multiplexers and demultiplexers (collectively referred to herein as multiplexers unless otherwise noted). The insertion loss of a particular optical component is, of course, approximately the sum of the insertion losses of the elements that make up the optical component. The insertion loss attendant state-of-the-art wavelength division multiplexers is high, thus decreasing the efficiency of an otherwise generally efficient optical system. The individual losses that make up the total insertion loss of a wavelength division multiplexer are represented by the following loss equation: $l_t = l_d + l_g + l_a + l_f$ where $l_d$ is the dispersion loss, $l_g$ is the grating reflection loss, $l_a$ is the aberration loss, and $l_f$ is the Fresnel reflection loss. In state-of-the-art multiplexers $l_t$ easily can greatly exceed 3 dB.

Each of the above individual losses can be identified with certain components or characteristics of a wavelength division multiplexer. Dispersion-broadening losses, $l_d$, are those losses due to broadening of the angular spectrum (beam spread) within the multiplexer. These losses are determined by the linewidth of the light source, wavelength separation between channels, and the relative positioning of the light sources and detectors about the optical axis of the multiplexer. Losses due to angular dispersion-broadening result because dispersion of the incoming light signal within the multiplexer causes the dispersed beam to have a larger spot size than the fiber core; thereby a portion of the light is not channeled into the output fiber. Grating losses, $l_g$, are the result of imperfections in the dispersion grating. Aberration losses, $l_a$, primarily are due to off-axial and chromatic aberration. Fresnel losses, $l_f$, primarily are due to the light signal passing through the glass-air interface on both sides of the focusing lens.

Furthermore, state-of-the-art wavelength division multiplexers cannot handle multiple wavelength ranges over a broad spectrum. State-of-the-art multiplexers are limited by the physics of single surface relief grating.

State-of-the-art wavelength division multiplexers have not achieved high efficiency. The losses in nearly all of these categories are high. As a consequence, the efficiency of the optical transmission system into which they are placed is drastically reduced. The need for a high efficiency broad-band wavelength division multiplexer is apparent.

SUMMARY OF THE INVENTION

A high efficiency wavelength division multiplexer is provided. Specifically, a wavelength division multiplexer employing optimally grouped input and output fiber optics, a Fourier transform (imaging) lens, and a holographic dispersion grating mounted at Littrow configuration in paraxial alignment is presented. Light waves enter and exit the wavelength division multiplexer in optical fibers. The optical axis of the wavelength division multiplexer extends through the center of the fiber optics grouping, the Fourier transform lens, and the holographic dispersion grating. In a demultiplexer embodiment, the input fiber lies in a vertical plane extending through the optical axis, and the output fibers are symmetrically spaced maximally close to the optical axis. The Fourier transform lens has a focal length f. The lens is positioned between the fiber end face and the center of the grating, such that each is located at the respective focal plane of the Fourier transform lens (the "f-f" distance relationship). The holographic dispersion grating, comprised of a set of Bragg planes formed by the interference of two light waves, is roughly one-third more efficient than metallic blazed gratings.

The total insertion loss of a wavelength division multiplexer in accordance with the present invention is between 1 and 2 dB, which is highly efficient. High efficiency unexpectedly is the result of the "f-f" distance relationship between the ends of the fiber optics, the Fourier transform lens, and the holographic grating. The maximally close orientation of the fiber optics about the optical axis, and the capabilities of the holographic dispersion grating arranged in a paraxial transmission optics system also contribute to the high efficiency.

In a further embodiment of the invention, multi-exposure holographic dispersion gratings, recorded by state of the art techniques, are dedicated to specific, limited ranges of wavelengths so that high operational efficiency for each wavelength range during multiplexing is maintained. Dedicating recorded Bragg plane sets to discrete wavelength ranges provides extremely broad overall wavelength capability without sacrificing efficiency as in conventional wavelength division multiplexers.

BRIEF DESCRIPTION OF THE DRAWINGS

FIG. 4 is a schematic of the relative orientation of fiber optics, a Fourier transform lens, and a holographic dispersion grating in accordance with FIG. 1;

FIG. 5 is a schematic of a wavelength division multiplexer illustrating variations in the positioning of the holographic dispersion grating;

FIGS. 6(a) and (b) are schematics showing, in directional cosine space, the fiber acceptance cone of ray distribution and the mismatched distribution due to non f-f configuration in a wavelength division multiplexer, respectively;

FIG. 7 illustrates a transmission and reflection multi-exposure holographic wavelength division multiplexer in accordance with the present invention;

FIG. 8 illustrates the orientation of a fiber bundle in accordance with FIG. 9; and FIG. 9 is a schematic of a multi-exposure reflection wavelength division multiplexer in accordance with the present invention.

BRIEF DESCRIPTION OF THE PREFERRED EMBODIMENTS

Figure 1:
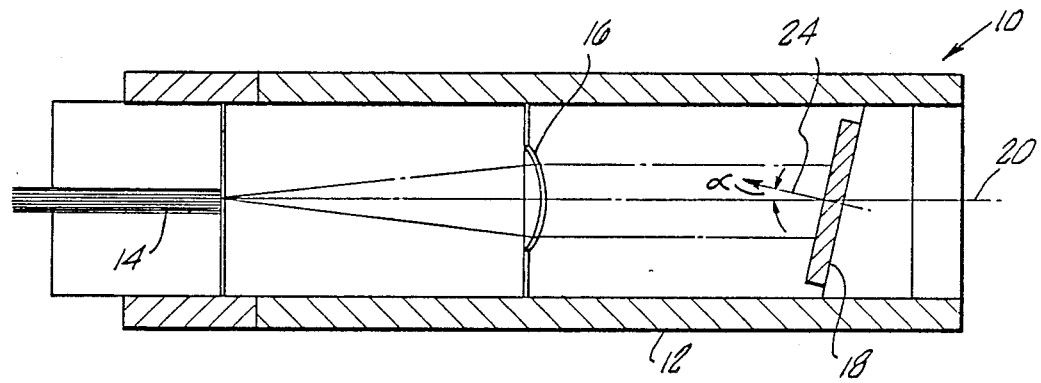
FIG. 1 is a schematic illustration of a wavelength division multiplexer in accordance with the present invention mounted in a housing.

Referring to FIG. 1, the numeral 10 designates a wavelength division multiplexer, contained in a housing 12, comprising fiber optics 14, Fourier transform lens 16, and a holographic dispersion grating 18. The housing 12 is compact, rugged, and serves to maintain the relative positioning and alignment of the fiber optics 14, lens 16, and dispersion grating 18, along optical axis 20.

The fiber optics 14 are those used primarily for optical telecommunication, and have minimal cladding diameter. The fibers are closely grouped about the optical axis 20. The Fourier transform lens 16 has a Fourier transformer focal length f. The lens is positioned within the housing 12 a distance f from the ends of the fiber optics 14. The lens 12 is centered on the optical axis 20. Of course, the lens is designed for minimizing aberrations. The dispersion grating 18 preferably is a high efficiency holographic element made of any of a number of materials such as dichromated gelatin (DCG) or $LiNbO_3$ (lithium niobate). The dispersion grating 18 is in a Littrow configuration with respect to the lens 16.

Figure 2A:
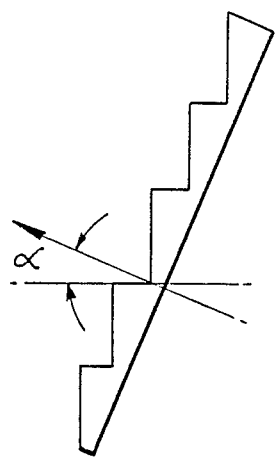
FIGS. 2(a) and (b) respectively provide a schematic of a blazed dispersion grating and a holographic dispersion grating.
Figure 2B:
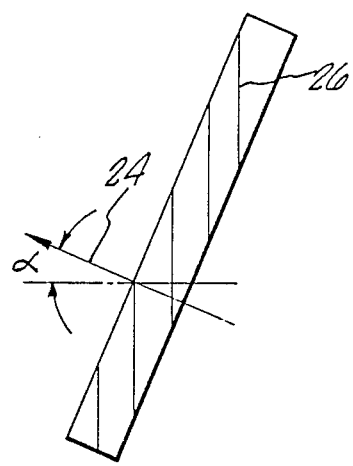

A grating normal 24 on the dispersion grating 18 forms an angle $\alpha$ with respect to the normal of the lens 16 mounted in the Littrow configuration. As best seen in FIG. 2, the Bragg planes 26 in the dispersion grating 18 are normal to the optical axis 20 (or more accurately, to the Fresnel refracted ray along the optical axis). This holds true for either the blazed grating in FIG. 2a or the holographic grating in FIG. 2b. The angle $\alpha$ can be seen in both of these figures.

Figure 3:
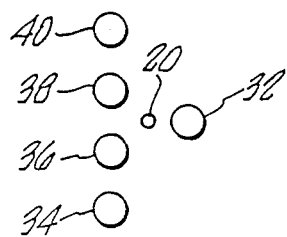
FIG. 3 is a schematic of the fiber bundle as viewed from the holographic dispersion grating along the optical axis.

Referring to FIG. 3, the configuration of the fibers 14 can be seen as viewed from the dispersion grating 18 along the optical axis 20. The input fiber designated 32 is located in a horizontal plane extending through the optical axis 20. Most importantly, the input fiber 32 is located immediately adjacent the optical axis. The output fibers designated 34, 36, 38, 40 are grouped as closely as possible about the optical axis 20. Furthermore, the optical fibers lie in a plane normal to the horizontal plane extending through the optical axis. The output fibers 34, 36, 38, 40 are symmetrically situated about the optical axis and the input fiber 32. In other words, there are an equal number of output fibers on either side of the horizontal plane extending through the optical axis 20.

Referring now to FIG. 4, the path of two light waves of different wavelength will be traced through the wavelength division multiplexer 10. Note that while this description involves only two different wavelengths of light, the present invention is capable of wavelength division multiplexing numerous different wavelengths.

A multiplexed light signal designated $\lambda_1 + \lambda_2$ traveling along the input fiber 30 in the fiber bundle 14 reaches the end of the input fiber and enters the air-filled space (or lens block) between the fiber bundle 14 and the lens 16. As the light wave $\lambda_1 + \lambda_2$ propagates towards the lens 16, it diverges. Its envelope is denoted by the two lines labelled $\lambda_1 + \lambda_2$ having arrowheads 32 and 32' pointing to the lens 16. As the light waves $\lambda_1 + \lambda_2$ pass through the lens 16, the light waves are collimated by the lens. When the light waves $\lambda_1 + \lambda_2$, still designated 32 and 32', reach the holographic diffraction grating 18, they are diffracted. The diffraction grating diffracts the $\lambda_1$ wavelength component differently than the $\lambda_2$ wavelength component of the composite $\lambda_1 + \lambda_2$ light wave.

Referring to the $\lambda_1 + \lambda_2$ light wave designated 32, the $\lambda_1$ wavelength component is diffracted along the line designated 34, and the $\lambda_2$ wavelength component is diffracted along the line designated 36. Referring now to the $\lambda_1 + \lambda_2$ composite light wave designated 32', the $\lambda_1$ wavelength component of that wave is diffracted along the line designated 34', and the $\lambda_2$ wavelength component is diffracted along the line designated 36'. Note that each of the two diffracted $\lambda_1$ wavelength components (rays), 34 and 34', are diffracted from the holographic diffraction grating 18 parallel to each other. Similarly, the two $\lambda_2$ wavelength components, 36 and 36', are diffracted from the holographic diffraction grating parallel to each other. In fact, all light rays of the same wavelength will be diffracted off the diffraction grating virtually parallel to each other (except for the slight divergence due to finite fiber size).

The two $\lambda_1$ light rays 34 and 34' are focused by the Fourier transform lens 16 into the $\lambda_1$ output fiber designated 38. The $\lambda_2$ light rays 36 and 36' are focused into the $\lambda_2$ output fiber designated 40. The angle at which the light signals 34, 34', 36, and 36' enter their respective output fibers is $\theta$.

Having described the paths of two light waves of different wavelength, the advantages of the structure of the present high efficiency wavelength division multiplexer invention can be detailed. Referring again to the equation $l_t = l_d + l_g + l_a + l_f$, one of the more important losses, $l_d$, losses due to dispersion of the light beams as they propagate through the multiplexer, is examined.

Referring to FIG. 5, the fundamental relationships representing the loss $l_d$ will be explained. As will be seen herein, the losses $l_d$ are minimized by the f-f distance relationship between the paraxially positioned fiber optics 14, the Fourier transform lens 16, and the holographic dispersion grating 18. In FIG. 5, the end of fiber 42 is spaced the distance f from a Fourier transform lens 44. The mid-point of a holographic grating 46 is in turn located a distance f from the lens 44. The holographic grating 48 is located a distance less than f from the lens 44. The distance between the holographic grating 46 and holographic grating 48 is $S_o$. A light ray 50 is shown diffracted from the holographic grating 46 and focused by the lens 44 into the fiber 42. The light ray 50 is the center ray of the light beam entering fiber 42 from the grating 46. A light ray 52 is shown diffracted from the holographic dispersion grating 48 through the lens 44 into the fiber 42. The light ray 52 is the center ray of the light beam entering fiber 42 from the grating 48. The difference in the angles between light rays 50 and 52 as they enter the fiber 42 is designated $\delta$.

The angular acceptance cone angle, C (in air), entering the fiber 42 is defined as:

$$C = 2 \cdot \sin^{-1}(NA) \qquad (1)$$

where NA is the numerical aperture of the fiber 42. For example, a typical fiber with NA=0.2 would having an acceptance cone angle C=23.07 degrees or 0.403 radians. This cone of light rays can be represented as a circular area 51 of radius R=NA in the "k-space" diagram as illustrated in FIG. 6a. Taking the Z-axis to be the optical axis, $K_x$ and $K_y$ are the x and y directional cosines of the rays. Referring again to FIG. 5, the light beam reflected from the grating 46 located at f from the lens with center ray 50, would have a ray distribution as illustrated in FIG. 6a if the lens 44 is perfect (free of aberrations). However, the light beam reflected from the grating 48, located at f-So from the lens with center ray 52, would have a similar ray distribution but the center of the circular area 53 is slightly shifted in the $K_y$ axis by an amount equal to sin δ as illustrated in FIG. 6b. Since the fiber accepts only those light rays that are within the circular area 51, part of the light beam received from dispersion grating 48 is obviously lost. The acceptance ratio, E, can be calculated from the area of overlap between the two circular areas 51 and 53 as follows:

$$E = \frac{2}{\pi} [\phi - \sin\phi\cos\phi] \quad (2)$$

$$\text{where } \phi = \cos^{-1}\left(\frac{\sin\delta}{2NA}\right) \text{ in radians.} \quad (3)$$

From FIG. 5 it is evident that tan $$\delta = \left(\frac{So}{f}\right)\left(\frac{d}{f}\right) \quad (4)$$

where d is distance of the fiber from the optical axis. Thus, the location of the grating is more critical for a higher number of multiplexing channels because d, and thus δ, increases with the number of channels. As a result of the f-f relationship structure disclosed herein, the number of channels that can be multiplexed is larger (more than 16 channels) than state-of-the-art multiplexing means.

The next loss indicated in the loss equation is $l_g$. The grating losses $l_g$ for an ideal grating are zero, i.e., the no loss case. Imperfections in the grating yield $l_g > $ zero. Other losses result in $l_g > 0$. For instance, in any grating, there will be some light waves that are not diffracted by the grating. Some of the light waves pass through the grating and are lost. Aberration losses, represented by $l_a$ in the loss equation, are reduced to a minimum in the present invention because the invention utilizes transmission imaging optics arranged paraxially. Transmission imaging optics systems do not use mirrors which inherently have high aberration. The paraxial nature of the multiplexer disclosed herein maintains the fiber optics maximally close to the optical axis. This type of paraxial system is not possible with a multiplexer using a reflective optics system. Lastly, Fresnel losses, represented by $l_f$ in the loss equation, can be minimized by antireflective coatings on the lens and therefore are considered to be zero.

All of the losses represented by the loss equation $l_t = l_d + l_g + l_a + l_f$ are minimized as a direct result of the fact that the present multiplexer utilizes transmission optics, is paraxial, utilizes a holographic volume grating, and maintains the f-f distance relationship between the fibers, the Fourier transform lens, and the holographic dispersion grating.

In further embodiments of the invention, the f-f distance relationship and the paraxial structure of the wavelength division multiplexer disclosed herein can provide a low loss optical wavelength dependent system. In FIG. 7, the f-f distance relationship is used in a combined reflection and transmission multi-exposure holographic wavelength division multiplexer. The multiplexer generally designated 60 comprises a standard housing 62, fiber optic bundle 64, lens 66, multiexposure dispersion grating 68, lens 70, and, finally, fiber optic bundle 72. The housing 62 is standard and serves to maintain the relative positioning and alignment of the components housed therein.

The optical fibers in the bundle 64 are in the standard arrangement shown in FIG. 3. The lenses 66 and 70 may have aspherical surfaces and are corrected for chromatic aberration. The dispersion grating 68 is holographic and is recorded with one set of Bragg planes for reflection and one set for transmission. The reflection Bragg plane set reflects the range of wavelengths $\Delta\lambda_1 = \{\lambda_1, \lambda_2, \ldots \lambda_n\}$ back toward the lens 66 and fiber bundle 64. The dispersion grating 68 diffracts each of the wavelengths in the range $\{\lambda_1, \lambda_2, \ldots \lambda_n\}$ differently, and the reflected light waves are focused into their respective output fibers by the lens 66. The dispersion grating 68 transmits all wavelengths outside the $\Delta\lambda_1$ band. In other words, the wavelengths outside that range pass through the dispersion grating 68 unaffected by the reflection Bragg plane set recorded therein.

The transmitted range of wavelengths, $\Delta\lambda_2 = \{\lambda_{(n+1)}, \lambda_{(n+2)}, \ldots \lambda_s\}$, are diffracted by a second set of Bragg planes recorded in the dispersion grating 68. Each of the diffracted light waves in the range $\{\lambda_{(n+1)}, \lambda_{(n+2)}, \ldots \lambda_s\}$ are diffracted differently by the dispersion grating 68. Each of the transmitted wavelengths is focused by the lens 70 into its respective output fiber in the fiber bundle 72. The lens 70 and fiber bundle 72 are similar in structure to fiber bundle 64 and lens 66.

The ability to reflect and transmit the multiplexed light signal in the wavelength division multiplexer disclosed herein with extremely low loss greatly expands the usefulness and operational spectrum, heretofore unattainable, of the multiplexer. Because of the use of multi-exposure holographic gratings each dedicated to a separate range of wavelengths, the invention can operate on an extremely broad wavelength range of light signals. Furthermore, it can operate on each of those wavelength ranges highly efficiently.

Continuing with FIG. 7, the distance between the end of the fiber bundle 64 and the lens 66 is f. The distance between the lens 66 and the dispersion grating 68 is also f so that the reflection portion of the wavelength division multiplexer satisfies the low loss f-f relationship. Likewise, the transmission portion of the wavelength division multiplexer also closely satisfies the f-f relationship and thus is of equally low loss. In other words, the distance between the lens 70 and the fiber bundle 72 is set so that the fiber bundle 72 collects the maximum amount of light collimated by the lens 70. As seen in the above treatment of the fundamental wavelength division multiplexer and analysis of the relationships and equations applicable thereto, the losses minimized by the f-f relationship and the Littrow configuration are the losses due to dispersion broadening, $l_d$, in the loss equation. Furthermore, because there is only one dispersion grating that performs both the reflection and transmission functions, the grating losses, $l_g$, in the loss equation, are also minimized. At the same time, though, the flexibility of the wavelength division multiplexer is greatly increased because of the ability to reflect one wavelength range of the demultiplexed signals while transmitting another range of demultiplexed signals into a separate fiber bundle.

Numerous embodiments of the invention are possible by varying the number of Bragg plane sets recorded in the dispersion grating and the set-up of the fiber bundle. For instance, the fiber bundle set-up shown in FIG. 8 enables a double reflection multi-exposure wavelength division multiplexer. In FIG. 8, the source fiber 76 is located directly on the optical axis. Two sets of output fibers, designated 78 and 80, are situated on either side of the source fiber 76. Each set of output fibers is situated normal to a vertical plane extending through the optical axis, where fiber set 78 is designated to receive the $\Delta\lambda_1$ wavelength band and the fiber set 80 is designated to receive the $\Delta\lambda_2$ band.

Referring to FIG. 9, a wavelength division multiplexer employing the fiber bundle set up of FIG. 8 and a double reflective multi-exposure dispersion grating is shown. The fiber bundle, generally designated 82, is shown in housing 84 also containing the dispersion grating 86. The dispersion grating 86 is recorded with two different Bragg plane sets each responsive to a separate range of wavelengths. One of the Bragg plane sets, for instance, responsive to the wavelength band $\Delta\lambda_1 = \{\lambda_1, \lambda_2, \ldots \lambda_n\}$, diffracts the light waves received from the source fiber 76 into the output fiber bundle 78. The other Bragg plane set recorded in the dispersion grating 86 diffracts the band of light waves $\Delta\lambda_2 = \{\lambda_{(n+1)}, \lambda_{(n+2)} \ldots \lambda_s\}$ coming from the source fiber 76 to the fiber bundle 80. The lens 88, as before, performs the function of collimating the source beam coming from the source fiber 76 onto the dispersion grating 86. Lens 88 also serves the function of focusing the light waves diffracted from the dispersion grating 8 into the respective fiber bundles 78 and 80. It is apparent that the wavelength division multiplexer embodiment shown in FIG. 9 can be used in cases where an extremely wide range of wavelengths is in use, or, where the signal from the source fiber 76 must be demultiplexed into many different light signals for many different discrete channels.

The wavelength division multiplexer can employ a multiexposure reflection and transmission dispersion grating. In this way, not only can the wavelength division multiplexer disclosed herein reflect one range of wavelengths and transmit another range of wavelengths, or reflect two ranges of wavelengths, it can both reflect and transmit two or more different ranges of wavelengths. It is apparent that a large number of permutations of fiber bundle set-up and dispersion grating recordings can be employed to meet the needs of almost any optical multiplexing/demultiplexing system. Moreover, because each of these embodiments can employ the advantageous f-f relationship in combination with paraxial optics, the losses in each of the embodiments will be lower than state-of-the-art wavelength division multiplexers.

It is to be understood that embodiments not shown but that fall within the scope of the claims are fully a part of this invention.

We claim:

1. A multiplexer/demultiplexer comprising
focusing means having a focal length f;
light signal carrying means for introducing light to and receiving light from the focusing means;
wavelength dependent light signal diffracting means positioned to receive light from and reflect diffracted light to the focusing means, said diffracting means comprising a holographic volume Bragg dispersion grating comprising dichromated gelatin (DCG);
the focusing means being positioned between and spaced the optical path distance f from the light signal carrying means and the diffracting means.

2. A multiplexer/demultiplexer comprising
focusing means having a focal length f;
light signal carrying means for introducing light to and receiving light from the focusing means;
wavelength dependent light signal diffracting means positioned to receive light from and reflect diffracted light to the focusing means, said diffracting means comprising a holographic volume Bragg dispersion grating comprising lithium niobate;
the focusing means being positioned between and spaced the optical path distance f from the light signal carrying means and the diffracting means.

3. A demultiplexer comprising
an input for a multiplexed light signal;
a first output;
a second output;
focusing means having a focal length f positioned to receive the multiplexed light signal;
means for diffracting a first and second range of wavelengths in the multiplexed light signal received from the focusing means according to wavelength back toward the focusing means, the focusing means being positioned between and the distance f from the means for diffracting and the input, and focusing the first and second range of wavelengths into the first and second outputs respectively, said diffracting means comprising holographic means recorded with a set of reflection Bragg planes for diffracting the first range of wavelengths and a set of reflection Bragg planes for diffracting the second range of wavelengths.

4. A demultiplexer comprising
an input for a multiplexed light signal; a first output for a light signal; a second output for a light signal; first focusing means positioned to receive light signals from the input; second focusing means; holographic means for diffracting and reflecting a first range of wavelengths in the multiplexed light signal from the first focusing means back to the first focusing means and diffracting and transmitting light signals in a second range of wavelengths from the first focusing means to the second focusing means;
the first focusing means focusing the diffracted, reflected light signals into the first output;
the second focusing means focusing the diffracted, transmitted light signals into the second output, said holographic means recorded with a set of reflection Bragg planes for diffracting and reflecting the diffracted, reflected light signals and a set of transmission Bragg planes for diffracting and transmitting the diffracted, transmitted light signals.

5. The invention as defined in claim 4 wherein the Bragg planes are recorded in DCG holographic means.

* * * * *